United States Patent
Kim et al.

(10) Patent No.: US 9,014,019 B2
(45) Date of Patent: Apr. 21, 2015

(54) MULTI-USER MIMO COMMUNICATION SYSTEM AND METHOD USING FEEDBACK INFORMATION

(75) Inventors: Sung-Jin Kim, Suwon-si (KR); Chang-Soon Park, Chungju-si (KR); Hong-Shuan Yang, Victoria (CA)

(73) Assignees: Samsung Electronics Co., Ltd., Suwon-si (KR); Korea University Industrial & Academic Collaboration Foundation, Seoul (KR)

( * ) Notice: Subject to any disclaimer, the term of this patent is extended or adjusted under 35 U.S.C. 154(b) by 412 days.

(21) Appl. No.: 13/092,806

(22) Filed: Apr. 22, 2011

(65) Prior Publication Data

US 2011/0310752 A1 Dec. 22, 2011

(30) Foreign Application Priority Data

Jun. 22, 2010 (KR) .......................... 10-2010-0059187

(51) Int. Cl.
*H04L 12/26* (2006.01)
*H04B 7/04* (2006.01)
*H04B 7/06* (2006.01)

(52) U.S. Cl.
CPC ............ *H04B 7/0452* (2013.01); *H04B 7/0645* (2013.01)

(58) Field of Classification Search
CPC ................................ H04W 4/00; H04W 88/02
USPC .......... 370/329, 342, 208, 330; 375/299, 267, 375/260, 221, 224, 219, 276; 455/452.2, 455/422.1
See application file for complete search history.

(56) References Cited

U.S. PATENT DOCUMENTS

| | | | |
|---|---|---|---|
| 6,845,089 B1 * | 1/2005 | Gu et al. | 370/337 |
| 8,229,019 B2 * | 7/2012 | Kotecha et al. | 375/276 |
| 2006/0098760 A1 * | 5/2006 | Shen et al. | 375/299 |
| 2006/0256761 A1 | 11/2006 | Meylan et al. | |
| 2007/0097915 A1 * | 5/2007 | Papasakellariou | 370/329 |
| 2007/0253507 A1 * | 11/2007 | Zhou et al. | 375/267 |
| 2007/0280116 A1 | 12/2007 | Wang et al. | |
| 2007/0291829 A1 * | 12/2007 | Nabetani et al. | 375/219 |
| 2008/0080449 A1 * | 4/2008 | Huang et al. | 370/342 |
| 2008/0080631 A1 * | 4/2008 | Forenza et al. | 375/260 |
| 2008/0107193 A1 * | 5/2008 | Erceg et al. | 375/260 |
| 2008/0153506 A1 * | 6/2008 | Yin et al. | 455/452.2 |
| 2008/0165836 A1 * | 7/2008 | Landau et al. | 375/221 |
| 2008/0165875 A1 | 7/2008 | Mundarath et al. | |
| 2008/0227417 A1 * | 9/2008 | Kludt | 455/101 |

(Continued)

FOREIGN PATENT DOCUMENTS

| | | |
|---|---|---|
| JP | 2009-141957 | 6/2009 |
| JP | 2009-165125 | 7/2009 |

(Continued)

*Primary Examiner* — Khaled Kassim
*Assistant Examiner* — Parth Patel
(74) *Attorney, Agent, or Firm* — NSIP Law

(57) ABSTRACT

The effective performance metric and achieving method of a multi-user multiple-input multiple-output (MU-MIMO) communication system are provided. A number of feedback bits of channel information may be determined based on an effective spectral efficiency (ESE). The ESE may correspond to a metric of the throughput performance with respect to a total radio resource including an uplink radio resource and a downlink radio resource. User-scheduling may be based on the feedback information that is based on the ESE, and thus, the throughput performance of the communication system may be enhanced.

28 Claims, 4 Drawing Sheets

(56) References Cited

U.S. PATENT DOCUMENTS

| | | |
|---|---|---|
| 2008/0298482 A1 | 12/2008 | Rensburg et al. |
| 2009/0238297 A1* | 9/2009 | Zhang et al. ............... 375/267 |
| 2009/0279419 A1* | 11/2009 | To et al. ...................... 370/208 |
| 2009/0279619 A1* | 11/2009 | Yang et al. .................. 375/260 |
| 2010/0039926 A1* | 2/2010 | Zhang et al. ............... 370/208 |
| 2010/0202502 A1* | 8/2010 | Tong et al. .................. 375/224 |
| 2010/0238913 A1* | 9/2010 | Xia et al. ..................... 370/342 |
| 2010/0323684 A1* | 12/2010 | Cai et al. ..................... 455/422.1 |
| 2011/0150052 A1* | 6/2011 | Erell et al. ................... 375/219 |
| 2011/0261781 A1* | 10/2011 | Vrzic et al. .................. 370/330 |

FOREIGN PATENT DOCUMENTS

| | | |
|---|---|---|
| KR | 10-2008-0114471 | 12/2008 |
| KR | 10-2009-0050085 | 5/2009 |

\* cited by examiner

MULTI-USER MIMO COMMUNICATION SYSTEM AND METHOD USING FEEDBACK INFORMATION

CROSS-REFERENCE TO RELATED APPLICATION(S)

This application claims the benefit under 35 U.S.C. §119(a) of Korean Patent Application No. 10-2010-0059187, filed on Jun. 22, 2010, in the Korean Intellectual Property Office, the entire disclosure of which is incorporated herein by reference for all purposes.

BACKGROUND

1. Field

The following description relates to a method of a multi-user multiple-input multiple-output (MU-MIMO) communication system.

2. Description of Related Art

One or more terminals may feed back channel information that is associated with a downlink channel to a base station. For example, a terminal may feed back channel information to a base station in a multi-user multiple-input multiple-output (MU-MIMO) system. The base station may perform spatial division downlink beamforming and user-scheduling based on the channel information that is fed back from the terminals, to transmit information signals to the terminals.

In the downlink beamforming and user scheduling, a trade-off may occur between the spectral efficiency of the downlink channel and the amount of spectral resources that are used for the feedback data. For example, if the amount of feedback data increases, the spectral efficiency of the downlink channel may be enhanced, however, the amount of spectral resources may be reduced.

SUMMARY

In one general aspect, there is provided a communication method of a terminal for a downlink reception in a wireless communication environment including a plurality of terminals and a base station including multiple transmit-antennas, the method including estimating a downlink channel between the base station and the terminal and obtaining an uplink channel state between the base station and the terminal, calculating an effective spectral efficiency (ESE) based on a length of feedback time expended when the terminal feeds back information associated with the downlink channel to the base station, determining a number of feedback bits of the information associated with the downlink channel based on the ESE, and feeding back information associated with the number of feedback bits to the base station.

The calculated ESE may be based on a total radio resource including an uplink radio resource and a downlink radio resource, and a total channel state including the uplink channel state and a downlink channel state.

The feeding back may comprises feeding back information associated with the downlink channel having a same number of feedback bits as the determined number of feedback bits, or feeding back information associated with the downlink channel having a different number of feedback bits from the determined number of feedback bits.

The feeding back may be performed based on whether the determined number of feedback bits is greater than a threshold.

The determining may comprise setting the number of feedback bits based on a length of the feedback time that maximizes the ESE.

The determining may comprise setting, as a maximal value of a lower bound of the ESE, either the ESE when the length of the feedback time is zero, or the ESE when a differentiation of the ESE with respect to the length of the feedback time is zero, and using the maximal value of the lower bound of the ESE to determine the number of feedback bits.

The calculating may comprise calculating the ESE based on the length of the feedback time within a limited total time resource, a length of time expended for a downlink transmission of the base station, and a sum-rate of the base station that is a function associated with the length of the feedback time.

The determining may comprise determining a number of feedback bits that maximizes the ESE.

The determining may comprise determining one of predetermined candidate values as the number of feedback bits.

The determining may comprise selecting one of the predetermined candidate values that maximizes the ESE.

In another aspect, there is provided a communication method of a terminal, the method comprising receiving a pilot signal from a base station, estimating a downlink channel state between the base station and the terminal, and obtaining an uplink channel state between the base station and the terminal, calculating an effective spectral efficiency (ESE) based on a length of feedback time expended when the terminal feeds back information associated with the downlink channel to the base station, determining a number of feedback bits of the information associated with the downlink channel based on the ESE, and transmitting, to the base station, information associated with the number of feedback bits and information associated with the downlink channel having a same number of bits as a predetermined reference value.

The calculated ESE may be based on a total radio resource including an uplink radio resource and a downlink radio resource, and a total channel state including the uplink channel state and a downlink channel state.

The determining may comprise determining the number of feedback bits that maximizes the ESE.

The determining may comprise determining one of predetermined candidate values as the number of feedback bits.

The method may further comprise feeding back remaining information associated with the downlink channel having a same number of bits as a difference between the number of feedback bits and the predetermined reference value, in response to a request from the base station.

The request from the base station may depend on whether the number of feedback bits is greater than a predetermined threshold.

In another aspect, there is provided a communication method of a base station, the method comprising receiving first information having a same number of bits as a reference value associated with a downlink channel between the base station and a plurality of terminals, receiving information associated with a number of feedback bits from each of the plurality of terminals, selecting active terminals from among the plurality of terminals based on the first information, and requesting, from the active terminals, remaining information associated with a downlink channel having a same number of bits as a difference between the number of feedback bits of the corresponding active terminal and the reference value, based on the number of the feedback bits of the active terminals.

The requesting may comprise requesting the remaining information associated with the downlink channel depending on whether the number of feedback bits of the active terminals is greater than a predetermined threshold.

The method may further comprise generating a precoding matrix for the active terminals.

The generating may comprise generating the precoding matrix based on the first information, in response to all the numbers of feedback bits of the active terminals being less than or equal to the predetermined threshold, and generating the precoding matrix based on the first information and the remaining information, in response to at least one of the numbers of feedback bits of the active terminals being greater than the predetermined threshold.

In another aspect, there is provided a terminal comprising an estimator configured to estimate a downlink channel between a base station and the terminal, a transmitter configured to transmit information about the estimated downlink channel to the base station, and a calculator configured to calculate an effective spectral efficiency (ESE) based on a length of feedback time expended when the terminal feeds back information associated with the downlink channel to the base station, and configured to determine a number of feedback bits of the information associated with the downlink channel based on the ESE, wherein the transmitter is further configured to feed back information about with the number of feedback bits to the base station.

The terminal may further comprise a receiver configured to receive data, from the base station, which has been generated using a precoding matrix based on the number of feedback bits determined by the terminal.

The calculated ESE may be based on a total radio resource including an uplink radio resource and a downlink radio resource, and a total channel state including the uplink channel state and a downlink channel state.

The calculator may determine a number of feedback bits that provides an ESE above a predetermined threshold amount.

The calculator may determine a number of feedback bits that provides a maximum ESE.

Figure 1:
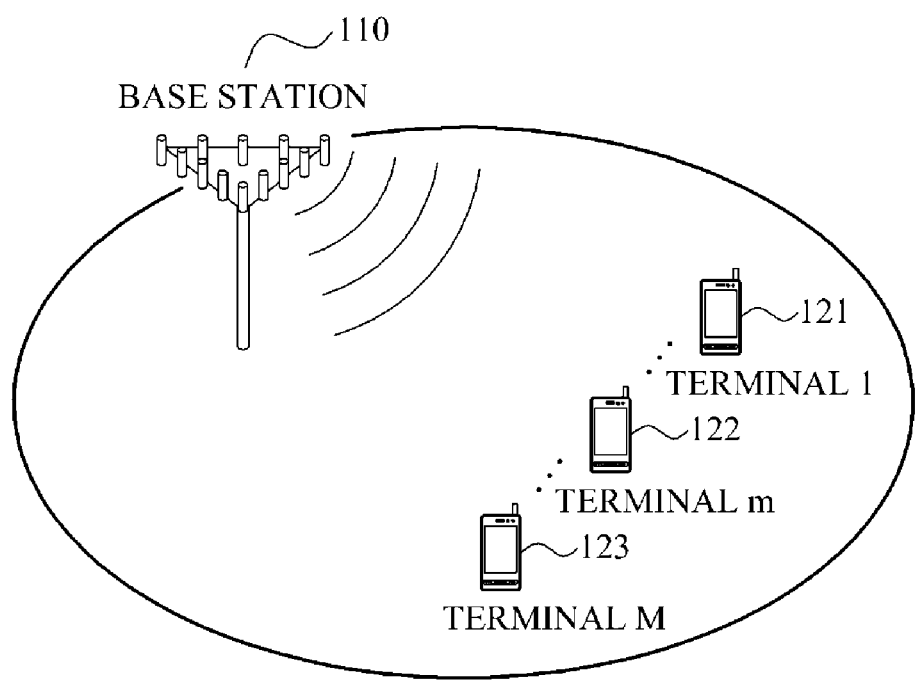
FIG. 1 is a diagram illustrating an example of a single-cell space-division multiple access (SDMA) system including a base station and a plurality of terminals.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A multi-user multiple-input multiple-output (MU-MIMO) transmission system may assume that channel state information (CSI) is fed back from each terminal to a base station before a starting point of a transmission time slot. Therefore, it may be desirable to enhance a spectrum efficiency of a downlink channel. As an example, it may be desirable to implement a recovery algorithm to compensate for a loss of transmission throughput due to a feedback signaling, to enhance the spectrum efficiency.

According to various examples herein, a transmission throughput of a system based on a time resource and a frequency resource expended for feeding back CSI may be evaluated using an effective spectral efficiency (ESE). For example, the ESE may be used to design or to analyze zero-forcing beamforming (ZFBF) in an MU-MIMO downlink transmission for a single receive-antenna or a multiple receive-antenna mobile terminal. Accordingly, the optimal amount of feedback signaling, for example, the optimal number of feedback bits, may be determined by selecting the optimal amount to achieve the maximal ESE, or a desirable amount of ESE.

Examples of a communication method of a terminal considering a loss due to a feedback signaling are described. In a first example, each terminal has a single antenna.

System Models

FIG. 1 illustrates an example of a single-cell space-division multiple access (SDMA) system including a base station and a plurality of terminals. In this example, the base station has M transmit-antennas and each terminal has a single antenna.

Referring to FIG. 1, the communication system includes a base station 110 and a plurality of terminals 121, 122, and 123. It should be appreciated that the number of terminals is not limited to three. For example, the communication system may include one terminal, two terminals, three terminals, or four or more terminals.

In this example, M terminals may be randomly selected, and the base station 110 may simultaneously perform a downlink transmission with respect to the M terminals. For example, a channel with respect to each of the terminals 121, 122, and 123 may be a frequency flat homogenous fading channel. A signal received by the terminal 122, which is an $m^{th}$ selected terminal, may be expressed by Equation 1.

$$y_m = h_m^H x + n_m, m=1,2,\ldots,M \quad \text{[Equation 1]}$$

In Equation 1, $h_m$ may be a complex channel vector of the $m^{th}$ terminal 122. Complex channel vectors of the terminals 121, 122, and 123 may be independent and identically-distributed, having an average of '0' and a dispersion of '1'. In this example, $n_m$ denotes an independent complex Gaussian noise having an average of '0' and a dispersion of '1'. Also, x denotes a transmitted symbol vector which may have a total power of P.

SDMA with Zero-Forcing Beamforming

Zero-forcing Beamforming (ZFBF) is a linear processing scheme that may be used to obtain a spatial multiplexing gain in a MU-MIMO system. According to the ZFBF scheme, a symbol vector transmitted by the base station 110 may be expressed by Equation 2.

$$x = \sum_{i=1}^{M} w_i^o s_i \quad \text{[Equation 2]}$$

In Equation 2, $s_i$ denotes information symbol for an $i^{th}$ terminal. Also, $w_i^o$ is a beamforming vector that may correspond to the information symbol, and may be orthogonal to channel vectors of other terminals. When the base station 110 is assumed to be completely aware of channel state information at a transmitter side (CSIT), a beamforming vector may be normalized rows of an inverse matrix of a channel matrix $[h_1, h_2, h_3, \ldots, h_M]$. In this example, the signal received by the $m^{th}$ terminal 122 may be expressed by Equation 3.

$$y_m = h_m^H \sum_{i=1}^{M} w_i^\rho s_i + n_m = h_m^H w_m^\rho s_m + n_m \qquad \text{[Equation 3]}$$

When $i \neq m$, $h_m^H w_i^o = 0$, and thus, all interference components may be removed or reduced because of the channel information based ZFBF. Therefore, an instantaneous sum-rate, or system throughput, of the ZFBF may be expressed by Equation 4.

$$R_{CSIT} = \sum_{m=1}^{M} \log_2\left(1 + \frac{P}{M}|h_m^H w_m^\rho|^2\right) \qquad \text{[Equation 4]}$$

Limited Feedback Signaling

Figure 2:
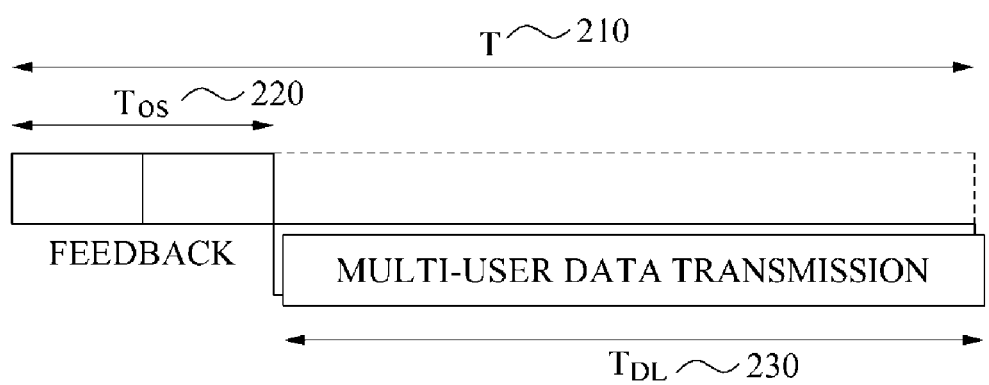
FIG. 2 is a diagram illustrating an example of a frame of a zero-forcing beamforming (ZFBF) system for digital feedback signaling.

The base station 110 may obtain downlink channel state information (CSI) through feedback signaling. FIG. 2 illustrates an example of a frame of a ZFBF system for digital feedback signaling.

Referring to FIG. 2, each terminal uses a length of a feedback time of $T_{OS}$ 220 divided by M. For example, a base station may transmit multiple-user data streams during a time of $T_{DL}$ 230. The capacity of a feedback channel may be limited. Due to the limited capacity of a feedback channel, the base station may use quantized channel vectors instead of actual channel vectors to generate beamforming vectors. That is, instead of sending back actual channel vectors, the channel vectors may be quantized, and less data may be used to to feed back the CSI.

For example, a beamforming codebook may be expressed as $C(2^B) \triangleq \{v_1, v_2, \ldots, v_{2^B}\}$. In this example, $v_i$ denotes a M-dimensional unit norm vectors, B denotes a number of feedback bits, and $2^B$ denotes a size of the codebook. The $m^{th}$ terminal 122 may quantize a normalized channel $\tilde{h}_m = h_m/\|h_m\|$ of the corresponding terminal as expressed by Equation 5.

$$\hat{h}_m = \arg\min_{v \in C(2^B)} \sin^2(\angle(\tilde{h}_m, v)) \qquad \text{[Equation 5]}$$

In Equation 5, $\sin(\angle(x,y)) = \sqrt{1-|x^H y|^2/(\|x\|^2\|y\|^2)}$. For example, each terminal may feed back to the base station, an index of the quantized channel $\hat{h}_m$. In this example, each terminal may have a feedback load of B-bits. In this example, each terminal may be randomly selected. As a result, a magnitude of a channel vector may not be fed back.

In a system with the limited feedback, for example, the beamforming vector may be normalized rows of an inverse matrix of a quantized channel matrix $[\hat{h}_1, \hat{h}_2, \ldots, \hat{h}_M]$. Therefore, the signal received by the $m^{th}$ terminal 122 may be expressed by Equation 6.

$$y_m = h_m^H w_m s_m + \sum_{i=1, i \neq m}^{M} h_m^H w_i s_i + n_m \qquad \text{[Equation 6]}$$

In Equation 6, residual interference may exist in $y_m$, due to the limited feedback. An expected instantaneous sum-rate or an average spectral efficiency $R_{LF}$ of the ZFBF system with the limited feedback may be expressed by Equation 7.

$$R_{LF} = E_C\left[\sum_{m=1}^{M} \log_2(1 + \rho_m)\right] \qquad \text{[Equation 7]}$$

In Equation 8, $\rho_m$ denotes a signal-to-interference-plus-noise ratio (SINR) of the $m^{th}$ terminal 122.

$$\rho_m = \frac{\frac{P}{M}|h_m^H w_m|^2}{1 + \frac{P}{M}\sum_{i=1, i \neq m}^{M}|h_m^H w_i|^2}. \qquad \text{[Equation 8]}$$

In this example, a quantization error may still affect the above SINR due to the limited feedback.

Effective Spectral Efficiency

In a feedback system including a ZFBF MU-MIMO, an amount of transmission of the feedback system may increase, as an amount of feedback signaling increases. As a result, a performance of a SINR of a downlink may also be enhanced. However, when the amount of feedback signaling increases, a normalized length of an effective downlink transmission time $T_{DL}$ 230 may be reduced. This reduction in transmission time may cause the total performance of the system to deteriorate, with less data being transmitted during the effective downlink transmission time $T_{DL}$ 230. For example, the length of the effective downlink transmission time may denote a time resource that may be used for a downlink transmission. The length of the effective downlink transmission time $T_{DL}$ 230 may be $T - T_{os}$, in which T may denote a length 210 of a total transmission time, and in which $T_{os}$ may denote a length of a feedback time. Therefore, a total performance considering an uplink loss may be expressed by Equation 9 using an ESE $R_{eff}$. Equation 9 may be an example of spectral efficiency considering the feedback loss.

$$R_{eff} = (1 - T_{os}/T) * R_{LF}(T_{OS}) \qquad \text{[Equation 9]}$$

In this example, $R_{LF}(T_{OS})$ denotes an average spectral efficiency of the ZFBF system in the limited feedback environment having a feedback time $T_{os}$.

For example, a terminal may calculate the ESE with respect to a total radio resource and a total channel state. For example, the total radio resource may include an uplink radio resource and a downlink radio resource and the total channel state may include an uplink channel state and a downlink channel state. The ESE may be determined based on the length of the feedback time $T_{os}$ 220 expended when the terminal feeds back information associated with a downlink channel between the base station and the terminal. For example, the length of the feedback time $T_{os}$ 220 may be proportional to the number of feedback bits.

Based on the ESE, the terminal may determine the number of feedback bits to be used for feeding back information to the base station, for example, feeding back information associated with the downlink channel between the base station and the terminal.

The following is an example of determining the number of the feedback bits.

First, the terminal may set a length of a feedback time that maximizes or increases the ESE. The ESE may be calculated based on the length of the feedback time within a limited total time resource, a length of a time expended for a downlink transmission of the base station, and a sum-rate of the base station that is a function associated with the length of the feedback time. The terminal may determine the number of feedback bits that maximizes or increases the ESE.

The terminal may determine the number of feedback bits from a plurality of candidate values. The terminal may calculate the ESE for each candidate value, and may determine a candidate value that maximizes the ESE. As another example, the terminal may calculate the ESE only for a pre-determined number of candidate values with respect to the number of feedback bits, for example ten candidate values, and the terminal may select a candidate value that maximizes the ESE from the candidate values. Then, a system that determines the number of feedback bits may be less complex.

Subsequently, the terminal may select an ESE, for example, the terminal may select an ESE when the length of the feedback time is zero, an ESE when a differentiation of the ESE with respect to the length of the feedback time is zero, and the like, as a maximal value of a lower bound of the ESE. The terminal may use the maximal value of the lower bound of the ESE to determine the number of feedback bits. For example, the feedback time $T_{OS}$ 220 that maximizes the ESE may be the feedback time $T_{OS}$ 220 that approximately maximizes the lower bound of the ESE. When the feedback time $T_{OS}$ 220 is determined, the number of feedback bits may be determined.

The terminal may feed back information associated with the number of feedback bits. For example, the terminal may feed back information associated with the downlink channel that has the same number of bits as the determined number of feedback bits, and/or information associated with the downlink channel that has a different number of bits from the determined number of feedback bits, based on whether the number of feedback bits is greater than a threshold. In this example, the threshold may be a predetermined value. In response to the number of feedback bits being less than or equal to the threshold, the information associated with the downlink channel that has the same number of feedback bits as the determined number of feedback bits may be fed back. As another example, in response to the number of feedback bits being greater than the threshold, the information associated with the downlink channel that has the different number of feedback bits from the determined number of feedback bits may be fed back. In this example, the different number of bits may be a predetermined reference value. For example, the predetermined reference value may be the same as the threshold.

A method of calculating the maximal value of the ESE and the number of feedback bits may be mathematically described. For example, the ESE may be a function with respect to the length of feedback time, and the number of feedback bits may be proportional to the length of feedback time.

An example of a method of determining the length of feedback time $T_{os}$ 220 that maximizes the ESE is described as follows.

In this example, a downlink transmission is performed block-by-block. A time during which each block period lasts is fixed as the total transmission time T 210. Each terminal may estimate a downlink channel between the base station and the corresponding terminal, in response to a transmission period beginning. For example, the terminals may estimate downlink channels based on pilot signals received from the base station. The terminals may feed back, to the base station, quantized downlink channel information. For example, the length of the feedback time $T_{os}$ 220 may be dependent on a number of feedback bits (B) of each terminal, a number of terminals (M), and/or a data rate of a feedback channel. Therefore, when the length of the feedback time $T_{os}$ 220 that maximizes the ESE is determined, the number of feedback bits (B) may also be determined.

After the feedback signaling, the base station may begin the downlink transmission based on a ZFBF scheme using a beamforming vector that may be generated based on the quantized channel vector. The length of the effective downlink transmission time $T_{DL}$ 230 may be $T_{DL}=T-T_{os}$. In this example, it is assumed that the feedback channel has the same bandwidth as the downlink channel. Based on the described transmission model, the ESE of the system may be expressed by Equation 10.

$$\mathcal{R}_{\mathit{eff}} = \frac{T - T_{OS}}{T} R_{LF} \qquad \text{[Equation 10]}$$

Referring to Equation 10, the ESE may be obtained by scaling an average spectral efficiency $R_{LF}$. For example, the ESE may be obtained by multiplying the average spectral efficiency $R_{LF}$ and a value obtained by dividing a difference between the length of the total transmission time T 210 and the length of the feedback time $T_{os}$ 220 by the length of the total transmission time T 210.

When the length of the feedback time $T_{os}$ 220 increases, an amount of feedback information allocated to each terminal may increase. The number of feedback bits B may increase. When the amount of feedback information of each terminal increases, a downlink spectral efficiency may also increase. However, when the length of the feedback time $T_{os}$ 220 increases, the length of the effective downlink transmission time $T_{DL}$ 230 may decrease. Accordingly, a maximal effective sum-rate $R^*_{\mathit{eff}}$ may be obtained by selecting an optimal value $T^*_{os}$ of the length of the feedback time $T_{os}$ 220, as expressed by Equation 11. For example, the effective sum-rate may be the same as the ESE, and thus, may be used together with the ESE throughout the specification.

$$\mathcal{R}^*_{\mathit{eff}} = \max_{T_{OS}<T} \mathcal{R}_{\mathit{eff}} \qquad \text{[Equation 11]}$$

When $R^*_{\mathit{eff}}$ is obtained by multiplying a function associated with the length of the feedback time $T_{os}$ 220, the optimal value $T^*_{os}$ may be calculated as a value maximizes in Equation 11. In this example, the function associated with the length of the feedback time $T_{os}$ 220 may be monotonically increasing with a monotonically decreasing function associated with the length of the feedback time $T_{os}$ 220. Mathematically, the optimal value $T^*_{os}$ may be obtained using an upper bound value, a lower bound value, and first order derivation of Equation 11. A maximal value of the lower bound of the ESE may be expressed by Equation 12.

$$R^*_{\mathit{eff}} = \max\{R_{\mathit{eff}}(0), R_{\mathit{eff}}(T_{OS})\}$$

In Equation 12, the optimal value $T^*_{os}$ may satisfy $d R_{\mathit{eff}}(T^*_{os})/d T_{os}=0$.

The maximal value of the lower bound of the ESE may be determined as the value of the ESE when the length of the feedback time $T_{os}$ 220 is zero, and as the value of the ESE when a differentiation of the ESE with respect to the length of the feedback time $T_{os}$ 220 is zero.

ZFBF System with Limited Feedback

The ESE may be used to evaluate a performance of the ZFBF system with the limited feedback using a multi-user beamforming frame structure of FIG. 2.

In the ZFBF system, the base station may transmit a plurality of streams to scheduled terminals, after feedback information is received from each terminal. In this example, a feedback channel is arbitrary and may support a data rate $R_{FB}$ with a low error probability. The data rate $R_{FB}$ may be a constant. Therefore, the number of feedback bits (B) for each terminal may have a relation of Equation 13 with the feedback time $T_{OS}$ 220.

$$T_{os} = MB/R_{FB} \quad \text{[Equation 13]}$$

A lower bound of the average spectral efficiency of the ZFBF system with the limited feedback may be calculated as expressed by Equation 14.

$$R_{LF} \geq R_{CSIT} - \log_2\left(1 + \frac{P}{M} E[\sin^2(\tilde{h}_i, \hat{h}_i)]\right) \quad \text{[Equation 14]}$$
$$\approx R_{CSIT} - \log_2\left(1 + \frac{P}{M} 2^{-\frac{B}{M-1}}\right)$$

The lower bound of the ESE of the ZFBF system may be expressed by Equation 15 that is associated with $T_{OS}$, based on the obtained approximate values.

$$\mathcal{R}_{\mathit{eff}}(T_{OS}) \geq \mathcal{R}^-_{\mathit{eff}}(T_{OS}) \quad \text{[Equation 15]}$$
$$= \frac{T - T_{OS}}{T}\left(R_{CSIT} - \log_2\left(1 + \frac{P}{M} 2^{-\frac{T_{OS}R_{FB}}{M(M-1)}}\right)\right)$$

Resource Optimization for Feedback Signaling

A method of selecting an optimal value of the feedback time $T_{OS}$ 220 that maximizes the ESE of the system may be as follows.

As the feedback time $T_{OS}$ 220 increases, the terminal may feed back a greater number of feedback bits (B) that brings a higher downlink spectral efficiency. However, when the feedback time $T_{OS}$ 220 increases the length $T_{DL}$ 230 of the effective downlink transmission time may decrease. The optimal value of the feedback time $T_{OS}$ 220 may be a value that maximizes $R^-_{\mathit{eff}}$ that is a lower bound of the ESE, as expressed by Equation 16.

$$T^*_{OS} = \arg\max_{T_{OS}<T} \mathcal{R}^-_{\mathit{eff}}(T_{OS}) \quad \text{[Equation 16]}$$

When a high SNR is used, the lower bound of the ESE $R^-_{\mathit{eff}}$ may be obtained as expressed by Equation 17.

$$\mathcal{R}^-_{\mathit{eff}}(T_{OS}) \approx \frac{T - T_{OS}}{T}\left(R_{CSIT} - \log_2\frac{P}{M} - \frac{T_{OS}R_{FB}}{M(M-1)}\right). \quad \text{[Equation 17]}$$

Equation 17 may be a quadratic function associated with the feedback time $T_{OS}$ 220. Therefore, the optimal value of the length of the feedback time $T_{OS}$ 220 that maximizes the ESE may be expressed by Equation 18.

$$T^*_{OS} = \frac{R_{CSIT} - \log_2\frac{P}{M} + \frac{TR_{FB}}{M(M-1)}}{2\frac{R_{FB}}{M(M-1)}} \quad \text{[Equation 18]}$$

Therefore, a maximal ESE obtained based on the lower bound $R^-_{\mathit{eff}}$ of the ESE may be expressed by Equation 19.

$$\mathcal{R}_{\mathit{eff}}^* = \mathcal{R}^-_{\mathit{eff}}(T^*_{OS}) \quad \text{[Equation 19]}$$

Therefore, the terminal may select the number of feedback bits (B) corresponding to the optimal value $T^*_{OS}$ that maximizes the ESE.

A second example in which a terminal has multiple antennas is described.

Multiple Receive-Antenna Scenario

An example in which each terminal has a single antenna has been described. The principle may be similar for a case in which each terminal has multiple antennas. When each terminal includes N receive-antennas, N being greater than two, each terminal may perform linear combining based on a quantization based combining (QBC) scheme, to enable signals received from the N antennas to be quantized and to reduce interference between terminals. Mathematically, when an N*M channel matrix of an $i^{th}$ terminal is $H_i$, an effective channel to which the QBC scheme is applied may be expressed by Equation 20.

$$h_i^{\mathit{eff}} = \alpha_i H_i \quad \text{[Equation 20]}$$

In Equation 20, $\alpha_i$ may be a unit norm weighting vector. In this example, an $\alpha_i$ that minimizes a difference between $h_i^{\mathit{eff}}$ and a quantization vector $\hat{h}_i$ corresponding to $h_i^{\mathit{eff}}$ may be determined. For example, $\hat{h}_i$ may be determined as expressed by Equation 21.

$$\hat{h}_i = \arg\min_{v \in C(2^B)} \sin^2(\angle(\mathrm{span}(H_i), v)) \quad \text{[Equation 21]}$$

The average spectral efficiency of the ZFBF system to which the QBC scheme is applied may be expressed by Equation 22.

$$R_{LF} \approx R_{CSIT} - \log_2\left(1 + P \cdot C_1 \cdot 2^{-\frac{B}{M-N}}\right) - C_2 \quad \text{[Equation 22]}$$

In Equation 22, $$C_1 = \left(\frac{(N-1)!(M-N+1)!}{M!}\right)^{1/(M-N)},$$

and $$C_2 = (\log_2 e)\sum_{l=M-N+1}^{M-1}\frac{1}{l}.$$

An approximate ESE of the ZFBF system that uses the QBC scheme and includes multiple antennas may be expressed by an equation associated with the feedback time $T_{OS}$ 220, as given in Equation 23, based on the described block transmission structure.

$$\mathcal{R}_{\mathit{eff}}(T_{OS}) \approx \quad [\text{Equation 23}]$$
$$\frac{T - T_{OS}}{T} \times \left( R_{CSIT} - C_2 - \log_2\left(1 + P \cdot C_1 \cdot 2^{-\frac{T_{OS}R_{FB}}{M(M-N)}}\right)\right)$$

Similar to the case of the single receive-antenna, an optimal value of the feedback time $T_{OS}$ 220 may be calculated based on the approximate ESE that is obtained in a high SNR area as expressed by Equation 24.

$$\mathcal{R}_{\mathit{eff}}(T_{OS}) \approx \quad [\text{Equation 24}]$$
$$\frac{T - T_{OS}}{T} \times \left( R_{CSIT} - C_2 - \log_2(P \cdot C_1) - \frac{T_{OS}R_{FB}}{M(M-N)}\right).$$

Therefore, the optimal value $T^*_{OS}$ of the length of the feedback time $T_{OS}$ 220 may be expressed by Equation 25.

$$T^*_{OS} = \frac{R_{CSIT} - C_2 - \log_2(P \cdot C_1) + \frac{TR_{FB}}{M(M-N)}}{2\frac{R_{FB}}{M(M-N)}}. \quad [\text{Equation 25}]$$

The maximal ESE corresponding to the optimal feedback time length $T^*_{OS}$ may be calculated as expressed by Equation 26.

$$R^*_{\mathit{eff}} = R_{\mathit{eff}}(T^*_{OS}) \quad [\text{Equation 26}]$$

As a number of antennas of each terminal increases to N, N is included in the equations. The N included in the equations may be the difference between the case using the single antenna and the case using the multiple antennas. The principle of determining the number of feedback bits may be the same as the case using the single antenna.

In a third example, the number of mobile users is larger than the number of transmit antennas at the base station.

Multiple User Scenario

When a number of scheduled users (i.e. terminals) is greater than a number of transmit-antennas of the base station, a method of determining both an optimal set of users and an optimal number of feedback bits considering a feedback signaling may be as follows. A lower bound of the average spectral efficiency of the ZFBF system in which multiple users are scheduled and has the limited feedback may be expressed by Equation 27.

$$R_{LF}(K) \approx R_{CSIT} - \log_2\left(1 + \frac{P}{M}2^{-\frac{B+\log_2 K}{M-1}}\right) \quad [\text{Equation 27}]$$

In Equation 27, K denotes a number of users in a corresponding scheduling period. Therefore, an optimal value of the feedback time $T_{OS}$ 220 in a multiple user scheduling system may be expressed by Equation 28 modulated from Equation 18 used in the case of the single user system.

$$T^*_{OS}(K) = \frac{R_{CSIT} - \log_2\frac{P}{M} + \frac{TR_{FB}}{M(M-1)}}{2\frac{R_{FB}}{M(M-1)}} - \frac{R_{FB}}{M}\log_2 K \quad [\text{Equation 28}]$$

When a number of scheduled terminals (K) is greater than the number of antennas (M) of the base station, the optimal value $T^*_{OS}$ of the feedback time $T_{OS}$ 220 may be determined, as shown in Equation 28. Therefore, the terminal may determine the optimal number of feedback bits B based on a mathematical relation with the feedback time $T_{OS}$, even when the user scheduling is considered because a large number of users exists.

When the feedback is optimized in the system including the multiple users based on the described method, each terminal may be configured to feed back the number of feedback bits calculated based on the described method, in addition to channel quality information (CQI) and channel direction information (CDI). For example, the CDI may include preferred matrix information (PMI) and preferred vector information (PVI).

Approaches for Multiple User Scheduling

The number of feedback bits B may be determined based on an expected-signal-to-interference-and-noise ratio (ES-INR). Each terminal may not be aware of a channel vector. An ideal reference for performing user scheduling based on the ESINR may be expressed by Equation 29.

$$\{S^*, W^*, Y^*_{OS}\} = \quad [\text{Equation 29}]$$
$$\arg\max_{S,W,Y_{OS}} \left(\frac{T - \sum_{k \in S} T_{OS,k}}{T}\right)\sum_{k \in S}\log_2(1 + ESINR_k(T_{OS,k}))$$

In Equation 29, S denotes a set of terminals and w denotes a beamforming vector. $Y_{OS} = \{T_{OS,k} | k \in S\}$ and $ESINR_k(T_{OS,k})$ which indicates that an effective signal to radio (SNR) may be a function associated with $T_{OS,k}$. Therefore, feedback information may include $T_{OS,k}$, a channel vector $\hat{h}_k$ as the CDI, and $ESINR_k$ as the CQI, to satisfy Equation 29.

Each terminal does not need to be aware of a channel state of another terminal, and thus, an each-terminal effective ESE $\mathcal{R}_{\mathit{eff},k}^{UE}$ expressed based on the ESINR may be expressed by Equation 30.

$$\mathcal{R}_{\mathit{eff},k}^{UE} = \left(\frac{T - M*T_{OS,k}}{T}\right)\log_2(1 + ESINR_k(T_{OS,k})) \quad [\text{Equation 30}]$$

In Equation 30, $ESINR_k(T_{OS,k})$ may be associated with $T_{OS,k}$, and thus, may be dependent on a size of a codebook. When the length $T_{OS,k}$ of the feedback time increases, $ESINR_k(T_{OS,k})$ may also increase, due to the size of the codebook of which a codeword length is $B = T_{OS}(\sum_{m=1}^{M} 1/R_{FB,k})^{-1}$, and the size of the codebook being $2^B$. However, an effective downlink transmission time denoted by $1-M*T_{OS,k}/T$ may decrease. Therefore, the process of calculating an optimal ESE $\mathcal{R}_{\mathit{eff},k}^{UE}$ may be replaced with a process of optimizing the length of the feedback time associated with the size of the codebook, as expressed by Equation 31.

$$T_{OS,k}(C^*) = \arg\max_{\{C_i\}_{i=1}^L} \mathcal{R}_{\mathit{eff},k}^{UE}(C_i) \quad [\text{Equation 31}]$$

In Equation 31, L denotes a number of different sizes of codebooks supported in the system. $T_{OS,k}(C) = \sum_{m=1}^{M} B(C) R_{FB,k}$. $2^{B(C)}$ denotes a codeword length of a codebook C. The terminal may determine an optimal size of the codebook for optimal feedback parameters, such as $T_{OS,k}$, $ESINR_k(T_{OS,k})$, and $w_{rx,k}$, based on Equation 30.

The ESINR of the multiple user system having B bits as the number of feedback bits and including K terminals, may be calculated by Equation 32.

$$ESINR_k \approx P\|w_{rx,k}^H H_k\|^2 \left(1 - 2^{-\frac{B+\log_2 K}{M-N}}\right)$$ [Equation 32]

In Equation 32, $B = T_{OS}(\Sigma_{m=1}^M 1/R_{FB,k})^{-1}$ and $w_{Rx,k}$ may be a receive combining weight.

User Scheduling Algorithm

Figure 3:
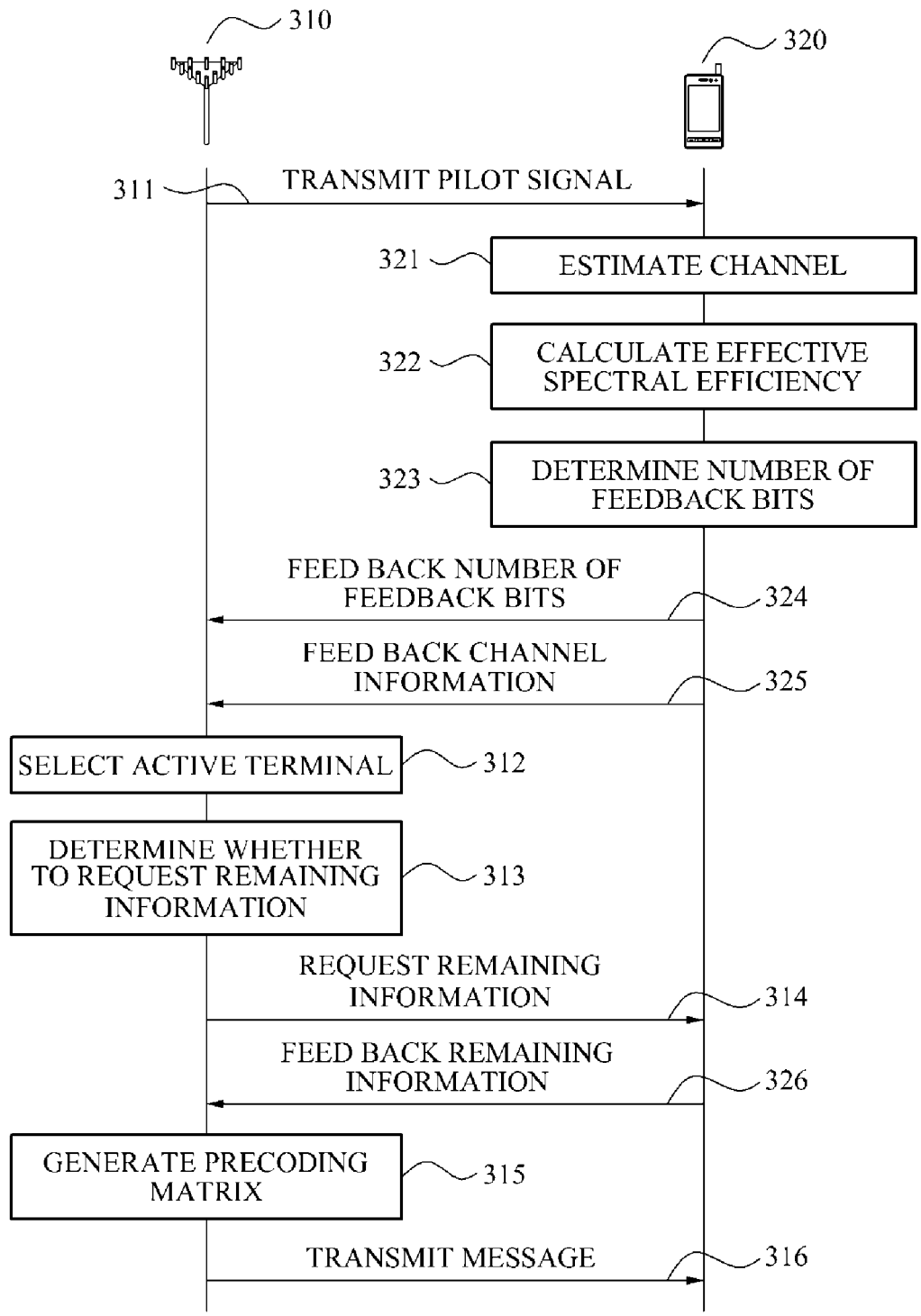
FIG. 3 is a flowchart illustrating an example of a scheduling method based on feedback information.

FIG. 3 illustrates an example of a scheduling method based on feedback information.

Referring to FIG. 3, a process of scheduling may be classified into two operations. In 311, a base station 310 transmits a pilot signal to each terminal of a plurality of terminals, for example, a terminal 320. Each terminal, such as the terminal 320, receives the pilot signal from the base station 310 and estimates a downlink channel, for example, CDI, between the base station 310 and the corresponding terminal. Each terminal, such as the terminal 320, obtains an uplink channel state, in 321. In this example, a channel state, (i.e., information associated with a channel) may denote secondary information that is obtained by signal-processing the measured channel information, indicating if the downlink channel is good or bad.

In 322, the terminal 320 calculates an ESE based on a length of a feedback time $T_{OS}$ 220 expended for feeding back information associated with the estimated downlink channel to the base station 310. For example, the ESE may be calculated using a total radio resource including an uplink radio resource and a downlink radio resource, and a total channel state including an uplink channel state and a downlink channel state.

The terminal 320 determines a number of feedback bits of the information associated with the estimated downlink channel based on the ESE, in 323. As one example, the terminal 320 may determine the number of feedback bits that maximizes the ESE. As another example, the terminal 320 may determine the number of feedback bits to achieve a threshold ESE. Each terminal may select one of a plurality of candidate values as the number of feedback bits, or may select a candidate value that maximizes the ESE from among the plurality of candidate values. As described above, the candidate values may be predetermined.

The terminal 320 transmits, to the base station, information associated with the number of feedback bits, in 324. The terminal 320 transmits, to the base station, first information indicating the information associated with the downlink channel having the same number of bits as a predetermined reference value, in 325. Each terminal, such as the terminal 320, may transmit the ESE or an ESINR to the base station 310.

The base station 310 may receive information associated with the number of feedback bits from each of the plurality of terminals, such as the terminal 320.

The base station 310 may receive the first information including the information associated with the reference value associated with the downlink channel between the base station 310 and each of the plurality of terminals, such as the terminal 320.

The base station 310 selects active terminals from among the plurality of terminals based on the first information, in 312. For example, the active terminal may be a terminal to which the base station 310 transmits a message.

The base station 310 determines a terminal from among the active terminals, to request remaining information from the determined terminal, in 13. For example, the remaining information may be information associated with the downlink channel that has the same number of bits as a difference between a number of feedback bits of each active terminal and the reference value. The remaining information may be remaining information after excluding the first information that has the same number of bits as the reference value from the information associated with the downlink channel having the same number of bits as the number of feedback bits. For example, the terminal from which the base station requests the remaining information may be selected by comparing the number of feedback bits of each active terminal with a threshold. The base station 310 may determine an active terminal that has a greater number of feedback bits than the predetermined threshold, as the terminal for the remaining information. In this example, the threshold may be the same as the reference value.

The process with which the base station 310 selects the active terminals and determines the terminal from which the base station 310 requests the remaining information is the first operation of the two operations. A second operation of scheduling may be performed as follows.

In 313, the base station determines whether to request remaining information from the terminals. The base station 310 requests, from each of the active terminals, the to remaining information associated with the downlink channel that has the same number as the difference between the number of feedback bits of the corresponding active terminal and the reference value, in 314.

In response to the request from the base station 310, corresponding terminals further feed back the remaining information to the base station, in 326.

When the base station 310 requests remaining information only from the selected active terminals, a total feedback time or a total amount of feedback information may be reduced as compared with a case in which all terminals transmit channel information having the number of feedback bits. An amount of information to be fed back may be limited in the first operation. As a result, channel information that has a greater number of feedback bits than the reference value may be prevented from being fed back to the base station 310, by terminals not selected as the active terminals. Therefore, a total transmission throughput may be enhanced.

The base station 310 generates a precoding matrix for the active terminals, in 315. For example, the base station 310 may generate the precoding matrix based on the first information, when all the numbers of the feedback bits of the active terminals are less than or equal to the predetermined threshold. As another example, the base station 310 may generate the precoding matrix based on the first information and the remaining information, when at least one of the numbers of the feedback bits of the active terminals is greater than the predetermined threshold.

The base station 310 transmits a message to each of the active terminals based on the generated precoding matrix, in 316.

Figure 4:
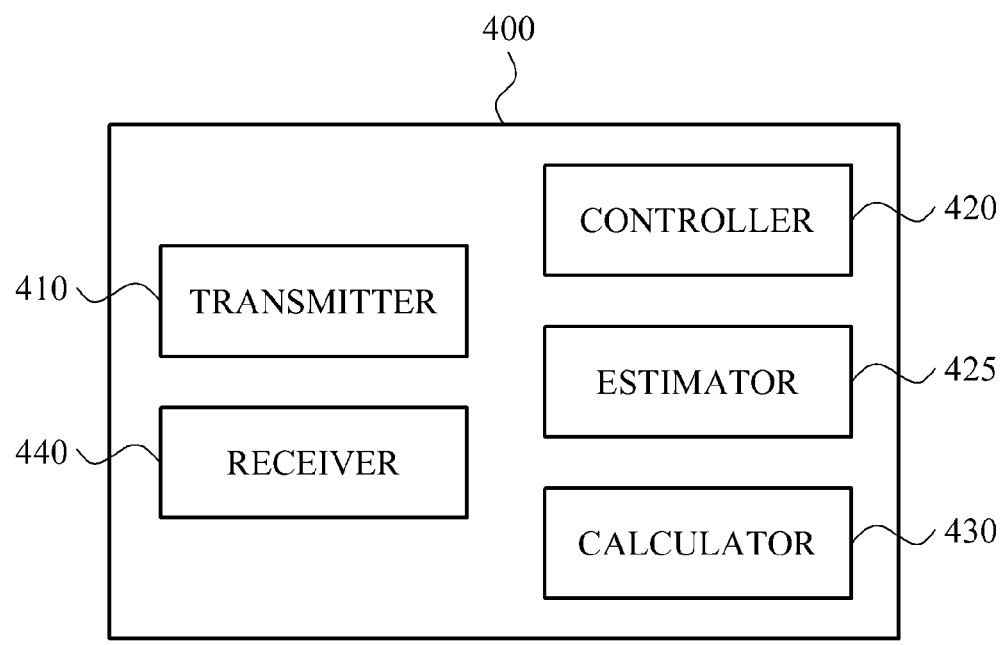
FIG. 4 is a diagram illustrating an example of a terminal.

FIG. 4 illustrates an example of a terminal.

Referring to FIG. 4, terminal 400 includes a transmitter 410, a controller 420, an estimator 425, a calculator 430, and a receiver 440. In this example, the transmitter 410 and the receiver 440 are illustrated as separate components, but the two components could be combined. For example, the transmitter 410 and the receiver 440 may be a transceiver. Also, the transmitter and the receiver may be, or may include one or more antennas.

For example, the terminal 400 may receive a pilot signal from a base station via the receiver 440. In response, the estimator 425 may estimate a channel between the base station and the terminal 400. For example, the estimator 425 may estimate a downlink channel between the base station and the terminal 400 and may obtain an uplink channel state between the base station and the terminal 400. For example, the estimator 425 may estimate a CDI, between the base station 310 and the corresponding terminal. As another example, may estimate a channel state such as secondary information that is obtained by signal-processing the measured channel information, indicating if the downlink channel is good or bad.

The transmitter 410 may transmit or feed back information about the estimated channel to the base station.

The calculator 430 may calculate an effective spectral efficiency (ESE) based on a length of feedback time expended when the terminal feeds back information associated with the downlink channel to the base station. For example, the ESE may be calculated based on a total radio resource including an uplink radio resource and a downlink radio resource, and a total channel state including the uplink channel state and a downlink channel state. Based on the ESE, the calculator may determine a number of feedback bits to use to transmit channel information back to the base station.

The transmitter 440 may transmit information about the number of feedback bits to the receiver. Subsequently, the terminal may receive messages from the base station. For example, the base station may generate a precoding matrix based on the number of feedback bits fed back from the terminal 400. The base station may transmit messages to the terminal 400 based on the generated precoding matrix.

The controller 420 may control the transmitter 410, the estimator 425, the calculator 430, and the receiver 440. While each of the components are separately illustrated in this example, it should also be appreciated that one or more of the transmitter 410, the controller 420, the estimator 425, the calculator 430, and the receiver 440 may be combined in the same unit.

The methods and systems describe above with reference to FIGS. 1 through 3 are also applicable to the terminal 400 described with reference to FIG. 4. Additional description thereof is omitted here for conciseness.

A communication method of a base station and a terminal considering a feedback loss, and a scheduling method of the base station have been described. Example embodiments described with reference to FIGS. 1 through 4 may be applicable to the communication method of a base station and a terminal considering a feedback loss, and the scheduling method of the base station, detailed description thereof will be omitted.

According to various examples described herein, a number of feedback bits used for channel information may be determined based on an effective spectral efficiency (ESE) with respect to a total radio resource. For example, the ESE may be calculated based on a length of time expended when a terminal feeds back information associated with a channel to a base station, and thus, an optimal number of feedback bits considering both an uplink feedback loss and a downlink capacity increase may be obtained. As a result, a performance of an MU-MIMO communication system may be enhanced.

According to example embodiments, a base station and a terminal may perform a downlink-beamforming based user scheduling, using a number of feedback bits based on an ESE with respect to a total radio resource. The scheduling considering a feedback loss may minimize the feedback loss during the scheduling.

The above-described processes, functions, methods, and/or software may be recorded, stored, or fixed in one or more computer-readable storage media including program instructions to be implemented by a computer to cause a processor to execute or perform the program instructions. The media and program instructions may be those specially designed and constructed, or they may be of the kind well-known and available to those having skill in the computer software arts. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and non-transitory computer-readable codes or program instructions may be stored and executed in a decentralized manner.

As a non-exhaustive illustration only, the device or terminal described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A communication method of a terminal for a downlink reception in a wireless communication environment including terminals and a base station including multiple transmit-antennas, the method comprising:
    estimating a downlink channel between the base station and a terminal and obtaining an uplink channel state between the base station and the terminal;
    calculating an effective spectral efficiency (ESE) based on a length of feedback time expended when the terminal feeds back information associated with the downlink channel to the base station;
    determining a number of feedback bits of the information associated with the downlink channel based on the ESE; and
    feeding back information associated with the number of feedback bits of the information to the base station,
    wherein the calculating comprises calculating the ESE based on the length of the feedback time within a limited total time resource, a length of time expended for a downlink transmission of the base station, and a sum-rate of the base station that is a function associated with the length of the feedback time.

2. The method of claim 1, wherein the calculated ESE is based on a total radio resource including an uplink radio resource and a downlink radio resource, and a total channel state including the uplink channel state and a downlink channel state.

3. The method of claim 1, wherein the feeding back comprises feeding back information associated with the downlink channel having a same number of feedback bits as the determined number of feedback bits, or feeding back information associated with the downlink channel having a different number of feedback bits from the determined number of feedback bits.

4. The method of claim 2, wherein the feeding back is performed based on whether the determined number of feedback bits is greater than a threshold.

5. The method of claim 1, wherein the determining comprises setting the number of feedback bits based on a length of the feedback time that maximizes the ESE.

6. The method of claim 1, wherein the determining comprises:
    setting, as a maximal value of a lower bound of the ESE, either the ESE when the length of the feedback time is zero, or the ESE when a differentiation of the ESE with respect to the length of the feedback time is zero; and
    using the maximal value of the lower bound of the ESE to determine the number of feedback bits.

7. The method of claim 1, wherein the determining the number of feedback bits comprises determining a number of feedback bits that maximizes the ESE.

8. The method of claim 1, wherein the determining the number of feedback bits comprises determining one of predetermined candidate values as the number of feedback bits.

9. The method of claim 8, wherein the determining the number of feedback bits comprises selecting one of the predetermined candidate values that maximizes the ESE.

10. A communication method of a terminal, the method comprising:
    receiving a pilot signal from a base station;
    estimating a downlink channel state between the base station and the terminal, and obtaining an uplink channel state between the base station and the terminal;
    calculating an effective spectral efficiency (ESE) based on a length of feedback time expended when the terminal feeds back information associated with the downlink channel to the base station;
    determining a number of feedback bits of the information associated with the downlink channel based on the ESE; and
    transmitting, to the base station, information associated with the number of feedback bits of the information and information associated with the downlink channel having a same number of bits as a predetermined reference value,
    wherein the calculating comprises calculating the ESE based on the length of the feedback time within a limited total time resource, a length of time expended for a downlink transmission of the base station, and a sum-rate of the base station that is a function associated with the length of the feedback time.

11. The method of claim 10, wherein the calculated ESE is based on a total radio resource including an uplink radio resource and a downlink radio resource, and a total channel state including the uplink channel state and a downlink channel state.

12. The method of claim 10, wherein the determining the number of feedback bits comprises determining the number of feedback bits that maximizes the ESE.

13. The method of claim 12, wherein the determining the number of feedback bits comprises determining one of predetermined candidate values as the number of feedback bits.

14. The method of claim 10, further comprising:
    feeding back remaining information associated with the downlink channel having a same number of bits as a difference between the number of feedback bits and the predetermined reference value, in response to a request from the base station.

15. The method of claim 14, wherein the request from the base station depends on whether the number of feedback bits is greater than a predetermined threshold.

16. A communication method of a base station, the method comprising:
    receiving first information having a same number of bits as a reference value associated with a downlink channel between the base station and terminals;
    receiving information associated with a number of feedback bits from each of the terminals;
    selecting active terminals from among the terminals based on the first information; and
    requesting, from the active terminals, remaining information associated with a downlink channel having a same number of bits as a difference between the number of feedback bits of the corresponding active terminal and the reference value, based on the number of the feedback bits of the active terminals,
    wherein the number of feedback bits is determined based on an effective spectral efficiency (ESE) which is calculated based on a length of the feedback time within a limited total time resource, a length of time expended for a downlink transmission of the base station, and a sum-rate of the base station that is a function associated with the length of the feedback time.

17. The method of claim 16, wherein the requesting comprises:
    requesting the remaining information associated with the downlink channel depending on whether the number of feedback bits of the active terminals is greater than a predetermined threshold.

18. The method of claim 16, further comprising generating a precoding matrix for the active terminals.

19. The method of claim 18, wherein the generating comprises:
- generating the precoding matrix based on the first information, in response to all the numbers of feedback bits of the active terminals being less than or equal to the predetermined threshold; and
- generating the precoding matrix based on the first information and the remaining information, to at least one of the numbers of feedback bits of the active terminals being greater than the predetermined threshold.

20. A terminal comprising:
- an estimator configured to estimate a downlink channel between a base station and the terminal;
- a transmitter configured to transmit information about the estimated downlink channel to the base station; and
- a calculator configured to calculate an effective spectral efficiency (ESE) based on a length of feedback time expended when the terminal feeds back information associated with the downlink channel to the base station, and configured to determine a number of feedback bits of the information associated with the downlink channel based on the ESE,
- wherein the transmitter is further configured to feedback information about with the number of feedback bits of the information to the base station,
- wherein the calculator calculates the ESE based on the length of the feedback time within a limited total time resource, a length of time expended for a downlink transmission of the base station, and a sum-rate of the base station that is a function associated with the length of the feedback time.

21. The terminal of claim 20, further comprising a receiver configured to receive data, from the base station, which has been generated using a precoding matrix based on the number of feedback bits determined by the terminal.

22. The terminal of claim 20, wherein the calculated ESE is based on a total radio resource including an uplink radio resource and a downlink radio resource, and a total channel state including the uplink channel state and a downlink channel state.

23. The terminal of claim 20, wherein the calculator determines a number of feedback bits that provides an ESE above a predetermined threshold amount.

24. The terminal of claim 20, wherein the calculator determines a number of feedback bits that provides a maximum ESE.

25. The method of claim 1, wherein the calculating comprises calculating the ESE for each of a plurality of candidate values, and
- wherein the determining the number of feedback bits comprises determining a candidate value from the plurality of candidate values that maximizes the ESE.

26. The method of claim 1, wherein the calculating comprises calculating the ESE for each of a predetermined number of candidate values of a plurality of candidate values, and
- wherein the determining the number of feedback bits comprises determining a candidate value from the predetermined number of candidate values of the plurality of candidate values that maximizes the ESE.

27. The method of claim 1, wherein the feeding back comprises feeding back information of the downlink channel that has a same number of feedback bits as the determined number of feedback bits in response to the number of feedback bits of the information being less than or equal to a threshold.

28. The method of claim 1, wherein the feeding back comprises feeding back information of the downlink channel that has a different number of feedbacks bits from the determined number of feedback bits in response to the number of feedback bits of the information being greater than a threshold.

* * * * *